F. W. RICKERS.
PROCESS FOR TREATING CEMENT BEER FERMENTING TANKS.
APPLICATION FILED FEB. 14, 1913.
1,162,515.
Patented Nov. 30, 1915.
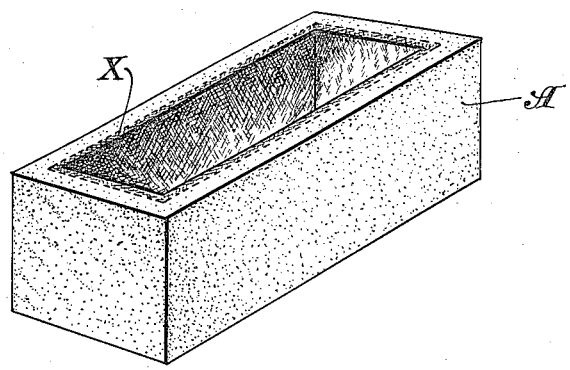
WITNESSES
INVENTOR
FRANK W. RICKERS
BY
ATTORNEYS ary attraction or by atmos
UNITED STATES PATENT OFFICE.

FRANK W. RICKERS, OF NEW YORK, N. Y., ASSIGNOR OF ONE-HALF TO F. & M. SCHAEFER BREWING CO., OF NEW YORK, N. Y., A CORPORATION OF NEW YORK.

PROCESS FOR TREATING CEMENT BEER-FERMENTING TANKS.

1,162,515.  Specification of Letters Patent.  Patented Nov. 30, 1915.

Application filed February 14, 1913. Serial No. 748,422.

*To all whom it may concern:*

Be it known that I, FRANK W. RICKERS, a citizen of the United States, residing in the city, county, and State of New York, have invented a certain new and useful Improvement in Processes for Treating Cement Beer-Fermenting Tanks, of which the following is a specification.

The object of the present invention is the production of a beer fermenting tank constructed of hydraulic cement or cement concrete or reinforced cement concrete which shall avoid the disadvantages incident to those previously constructed, and which shall be economical to construct, and which shall be substantially permanent when constructed.

Heretofore fermenting tanks have mostly been made of wood. They were round and mounted on complicated supports, crossbeams and the like and raised above the ground on posts or pillars in order to make it possible to have access to the bottom for cleaning purposes. The use of these tanks had the following disadvantages: Because of the round shape a great loss of space results which would be avoided if square or oblong tanks could be made. The maintenance of the tanks is a matter of great expense. They have to be varnished on the inside at least once a year. They have to be constantly cleaned at great expense. Their life is comparatively short. The size of the tanks is necessarily limited, thereby entailing additional labor connected with the filling, emptying, cleaning, etc., of several tanks. It has been proposed to make these tanks of concrete instead of wood or steel. Experiments have heretofore been made with tanks of concrete, but they have been open to the following objections which have prevented the extensive use thereof: When the concrete tanks (lined with plastic material such as pitch, asphalt, paraffin, etc.,) have been filled with the fermenting beer or wort, a certain amount of the soluble calcium and magnesium compounds and possibly other compounds in the concrete works its way through the layer of pitch and into the beer, and spoils an entire batch of the beer. Furthermore the concrete by capillary attraction conducts moisture very rapidly, and its porous nature allows it to soak up more or less of the fermenting beer, the acid of which is highly deleterious to the concrete.

I am not able to explain how or why the soluble lime and magnesia compounds work their way through the lining of pitch into the beer, but this actually occurs, and has to my knowledge been the cause for abandoning the concrete tanks in a number of breweries. I find that the following method of constructing and treating the tanks fully overcomes this objection. The tanks are made of a height suitable to their size and may be of unlimited size. The most suitable shape is oblong so that the corners of the rooms can be fully utilized. The tanks suitably spaced apart may be placed in rows with gangways in between. The tanks are made of extremely porous reinforced concrete. When the concrete tanks have been so constructed, they are filled with water (pure soft water being preferred) and allowed to stand for a period of two or three weeks, or, instead, running water may be allowed to flow through the tanks for a period of ten to fifteen days. The result of this treatment is that all or substantially all of the soluble calcium and magnesium compounds are removed from the concrete so that they are no longer present to injure the lining. The water is thereafter run out of the tanks, and the tanks are then thoroughly heated in order to dry out the moisture as thoroughly as possible. The inside of the tank while still hot is then coated with a plastic water-proofing material for example asphaltum, resin, paraffin, pitch or mixtures of these or other suitable substances. The higher the temperature, and the longer time the heat is applied, the more firm and lasting will be the adhesion between the lining and the tank; the prolonged heating of the tank drives out the larger part of the occluded air and moisture from the concrete, and the lining material will be forced into the concrete by capillary attraction or by atmospheric pressure. Several coats of the water-proofing material are applied so that the walls of the tank become impregnated for the distance of an inch, more or less. The impregnation has two objects: (*a*) to prevent the beer from coming in contact with the concrete; and (*b*) to prevent the beer from being soaked into the concrete.

The main objects of the invention is to eliminate the magnesia and lime thoroughly before the tank is used, because experience has shown that this material will work its way through the strongest linings.

The second object is to thoroughly dry the tank and then to apply a satisfactory lining by way of impregnation to prevent moisture from coming in and the beer and gases from going out.

In the drawing I have shown a tank A, constructed in accordance with my invention. The shaded portion X indicates the portion of the concrete which has become impregnated with the water-proofing material.

I have found by actual experiment that tanks constructed in accordance with the above description are absolutely free from the disadvantages which have hitherto stood in the way of the general introduction of concrete tanks in breweries.

When I speak in my claims of cement or of hydraulic cement I include in such terms any material containing such substances.

I claim:

1. The process of treating a tank constructed of cement which comprises treating the walls of the tank with water for a length of time sufficient to remove the soluble calcium and magnesium compounds, and thereafter applying a plastic water-proof lining to the tank.

2. The process of treating a tank constructed of cement which comprises treating the walls of the tank with water for a length of time sufficient to remove the soluble calcium and magnesium compounds, thereafter heating the walls of the tank until the larger part of the occluded air and moisture is driven out and thereafter applying a plastic water-proof lining to the tank.

3. The process of treating a tank constructed of cement which comprises treating the walls of the tank with water for a length of time sufficient to remove the soluble calcium and magnesium compounds, thereafter driving out of the walls of the tank by the application of heat, the larger part of the occluded air and moisture, and thereafter applying to the walls of the tank, while they are still hot, a plastic water-proof lining.

In witness whereof I have hereunto set my hand in the presence of two subscribing witnesses.

FRANK W. RICKERS.

Witnesses:
 LOUIS ALEXANDER,
 FRITZ ZIEGLER, Jr.